UNITED STATES PATENT OFFICE.

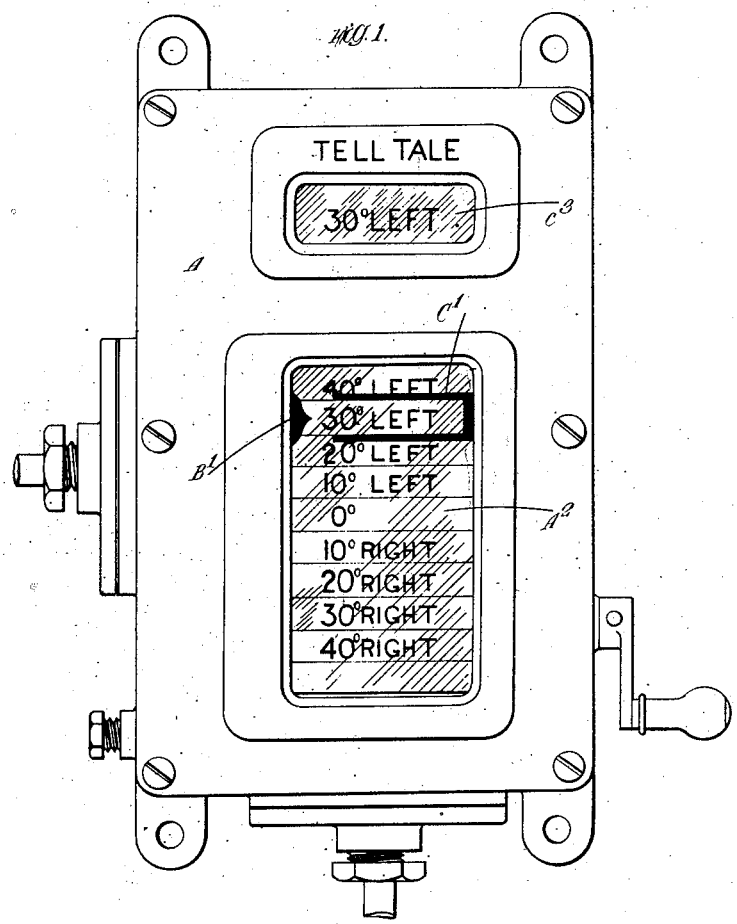
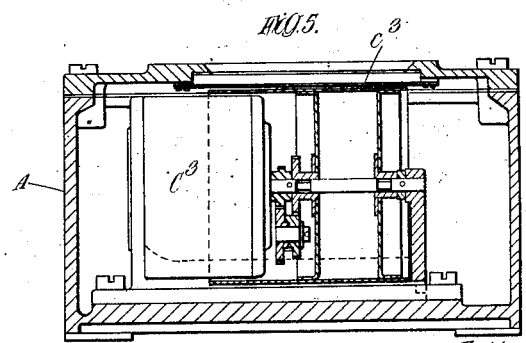

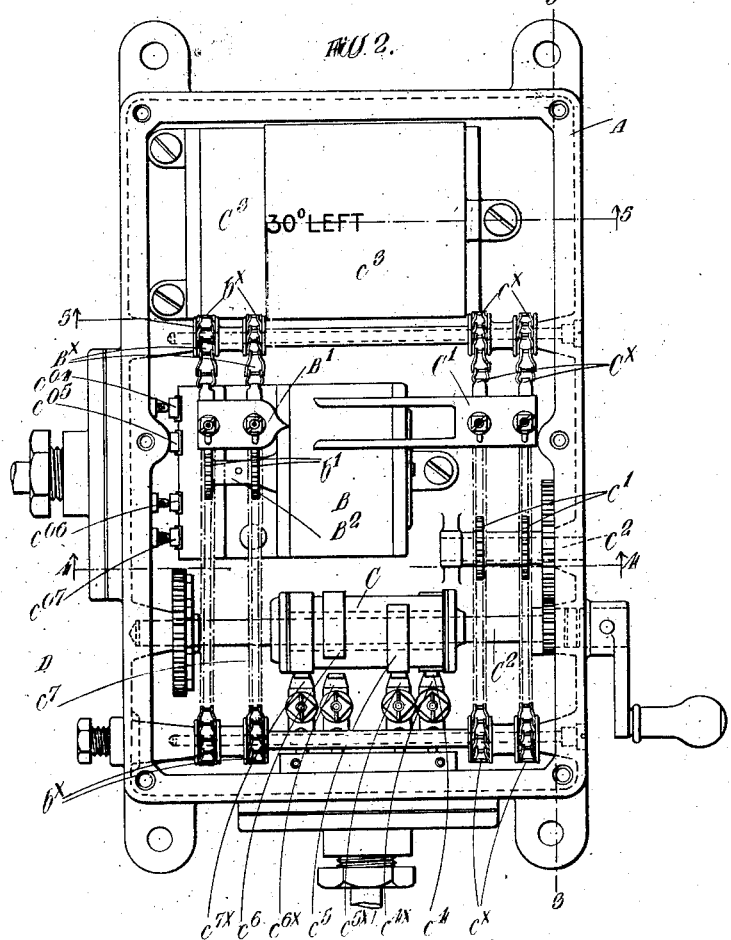
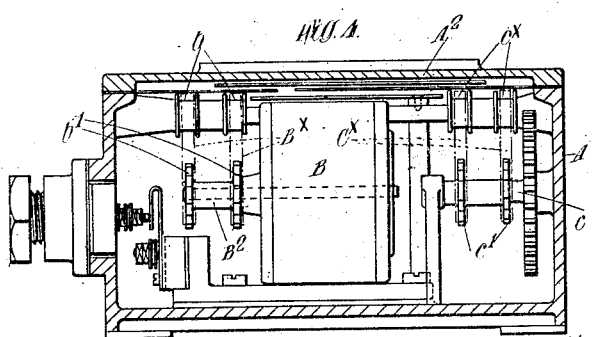

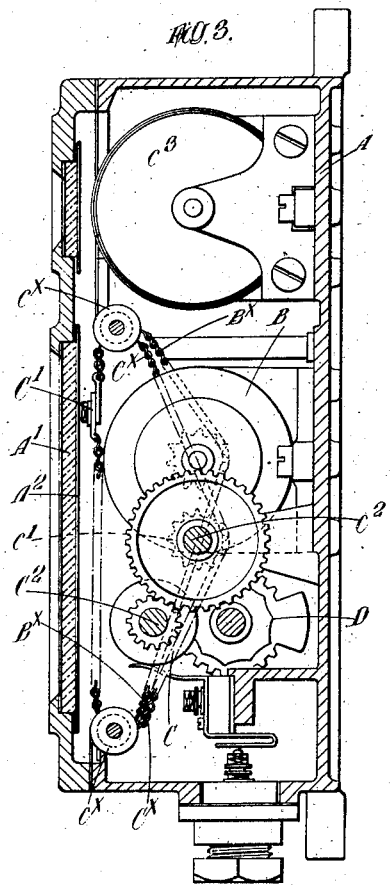

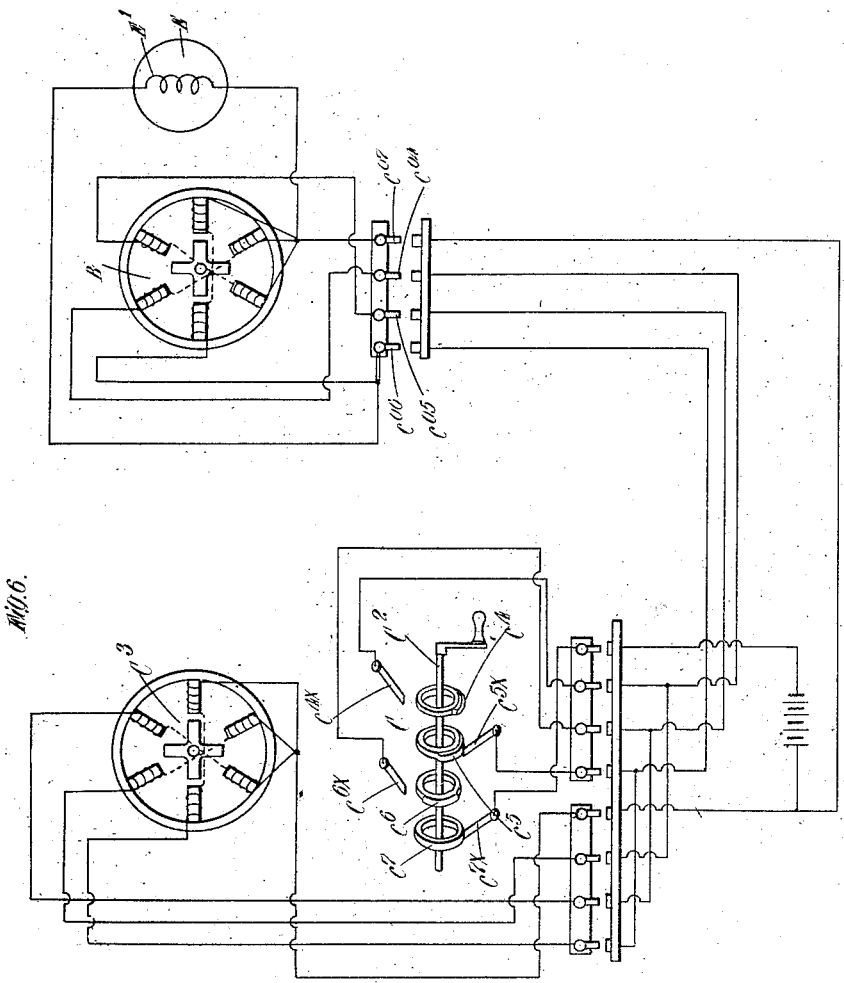

ARTHUR TREVOR DAWSON AND GEORGE THOMAS BUCKHAM, OF WESTMINSTER, LONDON, ENGLAND, ASSIGNORS TO VICKERS LIMITED, OF WESTMINSTER, ENGLAND.

ELECTRICAL APPARATUS FOR TRANSMITTING AND RECEIVING SIGNALS.

1,098,617.  Specification of Letters Patent.  Patented June 2, 1914.

Application filed December 31, 1912. Serial No. 739,440.

*To all whom it may concern:*

Be it known that we, ARTHUR TREVOR DAWSON, knight, and GEORGE THOMAS BUCKHAM, both subjects of the King of Great Britain, residing at Vickers House, Broadway, Westminster, in the county of London, England, have invented certain new and useful Improvements in or Relating to Electrical Apparatus for Transmitting and Receiving Signals, of which the following is a specification.

This invention relates to electrical apparatus for transmitting and receiving signals, and has particular reference to apparatus of the kind in which there is at the transmitting and the receiving station a switch and a step-by-step motor, each of which is adapted to actuate a pointer or the like, the switch at the transmitting station controlling the movements of the motor and its pointer at the receiving station and the switch at the receiving station controlling the motor and its pointer at the transmitting station.

According to the present invention the step-by-step motors (which are preferably of the kind having an odd number of pairs of field magnets and an armature with an even number of pairs of pole-pieces) and the transmitting switches for use with the said motors, are each adapted to displace an endless chain which carries the aforesaid pointer or the like, this arrangement of motors and chains resulting in a considerable reduction in the dimensions of the apparatus; the said chains are preferably duplicated in order to give a more efficient support to the pointers.

In order that the said invention may be clearly understood and readily carried into effect, the same will be described more fully with reference to the accompanying drawings in which—

Figure 1 is a front elevation showing a form of either the transmitting or the receiving apparatus constructed in accordance with the invention. Fig. 2 is a view similar to Fig. 1 with the front portion of the casing removed. Fig. 3 is a section taken approximately on the line 3 3 of Fig. 2. Figs. 4 and 5 are transverse sections taken respectively on the lines 4 4 and 5 5 of Fig. 2 and viewed in the direction of the arrows. Fig. 6 is a more or less diagrammatic view showing the electrical connections between the transmitting apparatus and the receiving apparatus.

In these figures A is the casing of the apparatus, (which is assumed to be the transmitting apparatus).

B is the step-by-step motor, and B′ the pointer driven thereby.

C is the switch and C′ the pointer driven mechanically by the handle which operates the switch. $B^x$, $B^x$ represent the chains driven by the motor B and $C^x$, $C^x$ represent the chains driven by the switch handle.

In the example illustrated the casing A has a glazed opening $A^1$ through which is exhibited an engraved plate $A^2$ graduated or marked in accordance with the signals or orders that are to be transmitted; for example in torpedo control apparatus the graduations (as shown in Fig. 1) indicate the number of degrees (to the right or left of a zero point) at which the torpedo tube is to be trained or to which the gyroscope of the torpedo is to be set. The two chains $C^x$ operated by the switch C pass over idle pulleys $c^x$ arranged near the upper and lower parts of the casing, the sprocket wheels $c'$ for actuating the chains being carried by a spindle $c^2$ that is geared by means of pinions with the shaft $C^2$ of the switch. The pointer C′ carried by the said chains $C^x$ is adapted to move in a rectilinear path over the engraved plate $A^2$ and is preferably, as shown, in the form of a frame that surrounds the particular graduation or order to which it is set so as to render the said graduation or order readily distinguishable from the others. The chains $B^x$ operated by the motor B are also carried by idle pulleys $b^x$ arranged near the upper and lower parts of the casing the said pulleys being directly actuated by sprocket wheels $b'$ on the motor shaft $B^2$.

The switch C is electrically connected with a step-by-step motor $C^3$ operating a "tell tale" $c^3$ in the form of a drum engraved with the orders that are marked on the plate $A^2$. The said switch is also electrically connected with the step-by-step motor forming part of similar apparatus at the receiving station. When the switch C at the transmitting station is moved to transmit an order, the frame pointer C′ operated thereby is moved mechanically to indicate the order it is desired to transmit. The tell tale $c^3$ in the transmitting apparatus is moved electrically to indicate the same order, a bell or gong E (Fig. 6) at the receiving station in electrical connection with the switch C is sounded, and the motor at this station is moved until the pointer driven thereby (corresponding to the pointer B' at the transmitting station) reaches the order that has been transmitted. When the operator at the receiving station, having had his attention attracted by the sounding of the gong, has read the order, he actuates the switch until the frame pointer moved thereby (corresponding to the frame pointer C') assumes a position opposite the motor driven pointer, and the tell tale (corresponding to the tell tale $c^3$) indicates the order transmitted; at the same time the switch also actuates the motor B at the transmitting station until the pointer B' moved thereby comes opposite the frame pointer C', thereby indicating to the operator at the transmitting station that the order has been received at the other station.

A Geneva stop D is provided and is suitably geared with the switch C in order to prevent the latter from being angularly displaced to a greater extent than that necessitated by the number of orders to be transmitted. The switch may have three contact segments $c^4$, $c^5$, $c^6$ and a contact ring $c^7$ (Fig. 2) each of which is adapted to bear against contacts $c^{4\times}$, $c^{5\times}$, $c^{6\times}$ and $c^{7\times}$, of which the first three are connected to other contacts $c^{o4}$, $c^{o5}$, $c^{o6}$ (Fig. 6) while the contact $c^{7\times}$ is connected to the positive pole of the source of electric supply. The contacts $c^{o4}$, $c^{o5}$, $c^{o6}$ are connected to the three pairs of field magnets of the step-by-step motor at the transmitting station; a contact $c^{o7}$ (Fig. 6) is connected to the negative pole of the source of electric supply. The armature of the motor has two pairs of pole pieces. It is to be understood that the parts shown diagrammatically in Fig. 6 are (with the exception of the gong) duplicated, that is to say, the transmitting station (which is shown on the left-hand side of Fig. 6) is provided with a motor B and the receiving station (which is shown on the right-hand side of Fig. 6) is provided with a switch C and a "tell-tale" motor $C^3$. This gong E as is shown diagrammatically in Fig. 6 is connected to one of the contacts $c^{o4}$, $c^{o5}$, $c^{o6}$, of the motor and to the contact $c^{o7}$. In this manner the gong will be sounded once during each revolution of the switch at the transmitting station.

What we claim and desire to secure by Letters Patent of the United States is:—

1. In electrical transmitting and receiving apparatus, the combination of a motor and a switch forming part of the transmitting apparatus, a similar motor and switch forming part of the receiving apparatus, means for electrically connecting the switch of each apparatus with the motor of the other apparatus the motor and switch being so constructed that movements of the switch result in proportional movements of the motor, two indicating devices capable of reciprocatory straight line movements, appertaining to each apparatus, flexible means for driving one device from its corresponding motor and another flexible means for driving the other device from its corresponding switch.

2. In electrical transmitting and receiving apparatus, the combination of a motor and a switch forming part of the transmitting apparatus, a similar motor and switch forming part of the receiving apparatus, means for electrically connecting the switch of each apparatus with the motor of the other apparatus the motor and switch being so constructed that movements of the switch result in proportional movements of the motor, two pointers capable of reciprocating straight line movements, appertaining to each apparatus, flexible means for driving one pointer from its corresponding motor, and another flexible means for driving the other pointer from its corresponding switch.

3. In electrical transmitting and receiving apparatus, the combination of a motor and a switch forming part of the transmitting apparatus, a similar motor and switch forming part of the receiving apparatus, means for electrically connecting the switch of each apparatus with the motor of the other apparatus, the motor and switch being so constructed that movements of the switch result in proportional movements of the motor, a pointer capable of reciprocatory straight line movement, appertaining to each apparatus, a frame capable of reciprocatory straight line movement, appertaining to each apparatus, means for driving the pointer from its corresponding motor, and means for driving the frame from its corresponding switch.

4. In electrical transmitting and receiving apparatus, the combination of a motor and a switch forming part of the transmitting apparatus, a similar motor and switch forming part of the receiving apparatus, means for electrically connecting the switch of each apparatus with the motor of the other apparatus, the motor and switch being so constructed that movements of the switch result in proportional movements of the motor, a pointer capable of reciprocatory straight line movement, appertaining to each apparatus, a frame capable of reciprocatory straight line movement appertaining to each apparatus, an endless chain for driving the pointer from its corresponding motor, and another endless chain for driving the frame from its corresponding switch.

5. In electrical transmitting and receiving apparatus, the combination of a motor and a switch forming part of the transmitting apparatus, a similar motor and switch forming part of the receiving apparatus, means for electrically connecting the switch of each apparatus with the motor of the other apparatus the motor and switch being so constructed that movements of the switch result in proportional movements of the motor, a pointer capable of reciprocatory straight line movement, appertaining to each apparatus, a frame capable of reciprocatory straight line movement, appertaining to each apparatus, two endless chains for driving the pointer from its corresponding motor, and two endless chains for driving the frame from its corresponding switch.

6. In electrical transmitting and receiving apparatus, the combination of a motor and a switch forming part of the transmitting apparatus, a similar motor and switch forming part of the receiving apparatus, means for electrically connecting the switch of each apparatus with the motor of the other apparatus, the motor and switch being so constructed that movements of the switch result in proportional movements of the motor, a pointer capable of reciprocatory straight line movement, appertaining to each apparatus, a frame capable of reciprocatory straight line movements, appertaining to each apparatus, two endless chains for driving the pointer from its corresponding motor, two endless chains for driving the frame from its corresponding switch, and a graduated transparent plate over which said pointer and frame reciprocate.

7. In electrical transmitting and receiving apparatus, the combination of a motor and a switch forming part of the transmitting apparatus, a similar motor and switch forming part of the receiving apparatus, means for electrically connecting the switch of each apparatus with the motor of the other apparatus, the motor and switch being so constructed that movements of the switch result in proportional movements of the motor, two pointers capable of reciprocatory straight line movements, appertaining to each apparatus, a flexible means for driving one pointer from its corresponding motor, another flexible means for driving the other pointer from its corresponding switch, a tell-tale, a motor for actuating said tell-tale, and means for electrically connecting the switch to said motor of the tell-tale.

8. In electrical transmitting and receiving apparatus, the combination of a motor and a switch forming part of the transmitting apparatus, a similar motor and switch forming part of the receiving apparatus, means for electrically connecting the switch of each apparatus with the motor of the other apparatus, the motor and switch being so constructed that movements of the switch result in proportional movements of the motor, a pointer capable of reciprocatory straight line movement, appertaining to each apparatus, a frame capable of reciprocatory straight line movement, appertaining to each apparatus, means for driving the pointer from its corresponding motor, means for driving the frame from its corresponding switch, a tell-tale, a motor for actuating said tell-tale, and means for electrically connecting the switch to said motor of the tell-tale.

9. In electrical transmitting and receiving apparatus, the combination of a motor and a switch forming part of the transmitting apparatus, a similar motor and switch forming part of the receiving apparatus, means for electrically connecting the switch of each apparatus with the motor of the other apparatus, the motor and switch being so constructed that movements of the switch result in proportional movements of the motor, a pointer capable of reciprocatory straight line movement, appertaining to each apparatus, a frame capable of reciprocatory straight line movement, appertaining to each apparatus, an endless chain for driving the pointer from its corresponding motor, another endless chain for driving the frame from its corresponding switch, a tell-tale, a motor for actuating said tell-tale, and means for electrically connecting the switch to said motor of the tell-tale.

10. In electrical transmitting and receiving apparatus, the combination of a motor and a switch forming part of the transmitting apparatus, a similar motor and switch forming part of the receiving apparatus, means for electrically connecting the switch of each apparatus with the motor of the other apparatus the motor and switch being so constructed that movements of the switch result in proportional movements of the motor, a pointer capable of reciprocatory straight line movement, appertaining to each apparatus, a frame capable of reciprocatory straight line movement, appertaining to each apparatus, two endless chains for driving the pointer from its corresponding motor, two endless chains for driving the frame from its corresponding switch, a tell-tale, a motor for actuating said tell-tale, and means for electrically connecting the switch to said motor of the tell-tale.

11. In electrical transmitting and receiving apparatus, the combination of a motor and a switch forming part of the transmitting apparatus, a similar motor and switch forming part of the receiving apparatus, means for electrically connecting the switch of each apparatus with the motor of the other apparatus, the motor and switch being so constructed that movements of the switch result in proportional movements of the motor, a pointer capable of reciprocatory straight line movement, appertaining to each apparatus, a frame capable of reciprocatory straight line movement, appertaining to each apparatus, two endless chains for driving the pointer from its corresponding motor, two endless chains for driving the frame from its corresponding switch, a graduated transparent plate over which said pointer and frame reciprocate, a tell-tale, a motor for actuating said tell-tale, and means for electrically connecting the switch to said motor of the tell-tale.

In testimony whereof we affix our signatures in the presence of two witnesses.

ARTHUR TREVOR DAWSON.
GEORGE THOMAS BUCKHAM.

Witnesses:
HENRY KING,
JNO. R. CASWELL.